United States Patent Office 3,183,776
Patented May 18, 1965

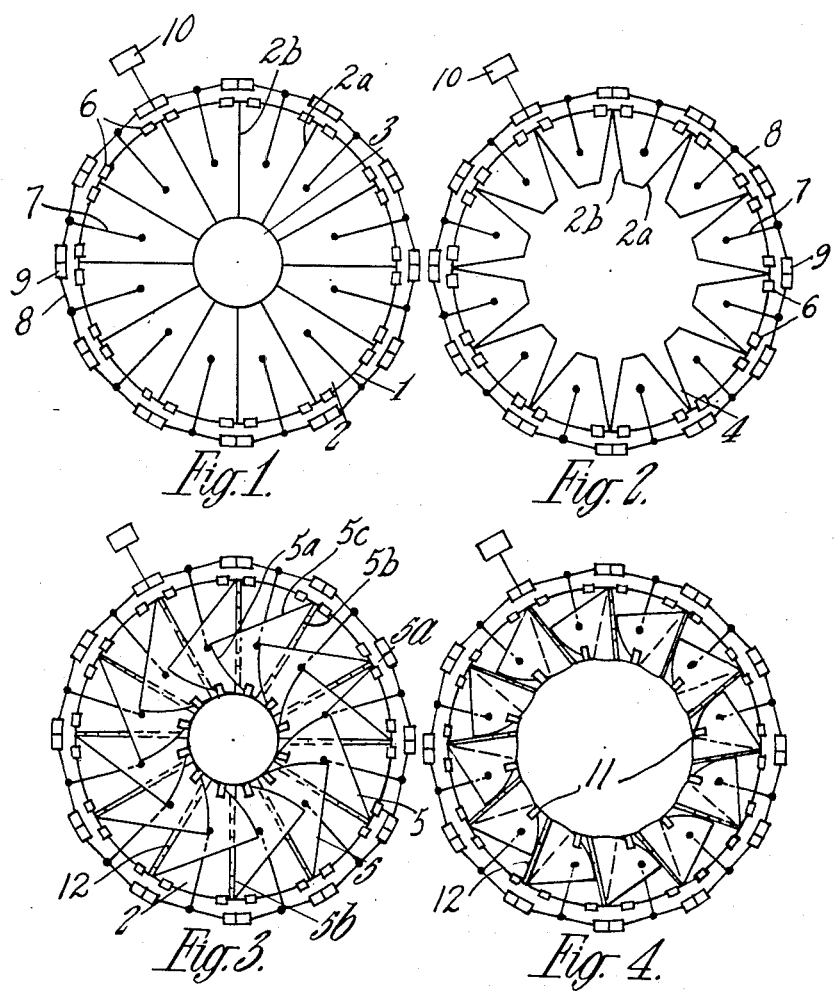

3,183,776
MIRROR COVER FOR REFLECTING TELESCOPES
Douglas Edward Wallis, Newcastle-upon-Tyne, England, assignor to Sir Howard Grubb Parsons & Company Limited, Newcastle-upon-Tyne, England
Filed Oct. 2, 1961, Ser. No. 142,051
Claims priority, application Great Britain, Oct. 12, 1960, 34,978/60
2 Claims. (Cl. 88—32)

This invention relates to optical reflecting telescopes.

In such telescopes it is usual to cover up the reflector or mirror when the telescope is not in use. This may be done in various ways, but one particularly suitable way is to form the cover by means of a series of separate sector-shaped cover members, hinged around the outer periphery of the mirror, which members can be moved towards or away from the mirror as desired. When in the closed position they cover the mirror and when they are in the fully open position they expose the whole or substantially the whole of the mirror.

The members when moving pivot about the edge which is hinged to the outer periphery of the mirror and consequently as they move away from the mirror gaps open up between adjacent edges of the cover members.

In some applications of such telescopes it is desirable to have a variable mirror aperture that is to say the area of the mirror exposed to light should be variable to suit varying conditions.

The abovementioned cover arrangement would provide, in addition, a suitable variable aperture as the cover members moved were it not for the fact that the gaps were formed between adjacent edges of the members as they moved away from the fully closed position.

It is accordingly an object of the present invention to modify the construction of the sector-shaped cover arrangement so that as the cover members are moved the gaps formed between them are covered at all times thus enabling the arrangement to provide a combined mirror cover and variable aperture device.

According to the present invention there is provided in a telescope incorporating a mirror, a mirror cover comprising a series of sector-shaped cover members hinged around the outer periphery of the mirror, coupling means between said cover members and means for moving the members about their hinges so that the members move from a closed position in which they lie in a substantially single plane to an open position in which they lie in different planes and a sector-shaped flexible member disposed with its arcuate edge pointing towards the centre of the mirror attached to and extending along a radial edge of each cover member so that as the cover members move out, the flexible members cover the gaps for all positions of the cover members, despite the fact that they are moving in different planes.

One mode of carrying the present invention into effect will now be described, by way of example, with reference to the accompanying diagrammatic drawings in which:

FIGURES 1 and 2 show two positions of the cover members of a cover arrangement on which the present invention is based; and FIGURES 3 and 4 show the corresponding position of the cover members as illustrated in FIGURES 1 and 2 but showing the modification of the cover arrangement in accordance with the present invention.

In carrying the invention into effect in the forms illustrated by way of example and referring firstly to FIGURES 1 and 2 which show arrangements as proposed hitherto, the outline of a telescope mirror is indicated by the circle 1. Covering the mirror are a series of sector-shaped cover members 2. The members 2 are not, in the form illustrated, complete sectors in that when in the position shown, which is the position in which maximum cover is given, a small central aperture 3 remains. In such a case this aperture corresponds to an aperture in the mirror itself through which light can pass when the telescope is in operation. The invention is not however, limited to such an arrangement, and the cover member can be completely sector-shaped within practical limits, if so desired, so as completely to cover the mirror. In other words, each cover 2 has two straight converging sides, 2a and 2b, see FIG. 2.

The members 2 are hinged by hinges 6 adjacent the periphery of the mirror and can be individually moved in synchronism by means comprising mechanically operated rods 7 driven from a common shaft formed by a series of separate shafts 8 connected by universal joints 9. The common shaft is driven by a prime mover 10.

It will be seen from FIGURE 2, that as the cover members are moved from the mirror, the mirror in uncovered and in the final position the members will be almost at right angles to the mirror.

Thus, the cover members are pivotally mounted around the periphery of the mirror for pivotal movement toward and away from the axis of the mirror and when the cover members lie in closed position as in FIG. 1, the two straight converging sides 2a and 2b are disposed radially with respect to the axis of the mirror. Further, in closed position the cover members cover at least an annular portion of the mirror. When the cover members are moved to open position, they lie in different planes.

As the cover members are moved away from the mirror the area of the mirror exposed is increased and these cover members are modified as shown in FIGURES 3 and 4 so that as they are moved away from the mirror, gaps 4 (see FIGURE 2) formed between adjacent members are covered. In this way the arrangement of cover members can also be used as a variable aperture device.

The step of the present invention takes the form of an addition of flexible members 5 to the cover members and these members 5 cover the gaps 4 as the cover members 2 are moved.

In the preferred form each flexible member 5 is almost sector-shaped and includes opposite straight edges 5b and 5c that are diverging and a connecting edge 5a extending therebetween with part of the connecting or arcuate edge 5a of each member being constrained by or attached by guides to the radially inner edge of the cover member 2 as can be seen in FIGURES 3 and 4, each guide 11 being in the form of an arm secured to the cover member 2 and projecting over the adjacent flexible member 5. Also one straight or radial side or edge 5b on each member 5 is attached by suitable attaching means such as at 12 to a radial or straight edge or side of a cover member 2 with the connecting edge of the associated flexible member being located inwardly of the periphery of the mirror. As clearly shown in the drawing, each flexible member 5 is dimensioned so that with the cover members closed as shown in FIG. 3, the other straight edge 5c of each flexible member overlies the adjacent cover member 2.

When the cover members are being moved towards or away from the closed position the flexible members 5 slide over the surface of the members 2 and at all times cover the gaps 4 formed between the latter.

The members 5 slide in the guides 11 on the members 2 which help to keep the members 5 in contact with the cover members 2 as the latter are moved and also to overlap the gaps 4 at all times.

The members 5 can be on the side of the cover members remote from the mirror, as shown, or they may be on the side of the said members nearest the mirror.

It will thus be appreciated that the present invention provides an arrangement which is such that as the cover members are moved the gaps formed between them are covered at all times thus enabling the arrangement to provide a combined cover and variable aperture device.

It will be further appreciated that the foregoing details are given by way of example only and that any desired modifications may be made to the invention, within the scope of the appended claims.

I claim:

1. In a telescope incorporating a mirror, a mirror cover comprising a series of movable cover members pivotally mounted around the periphery of the mirror for pivotal movement toward and away from the axis of the mirror, each cover member having two straight converging sides which, when the cover members lie in closed position in a plane substantially perpendicular to the axis of the mirror are disposed radially with respect to said axis, means coupled to said cover members for moving said members in unison and causing them to pivot about the periphery of said mirror from said closed position where they fit together to cover at least an annular portion of the mirror to an open position in which the cover members lie in different planes with gaps defined between adjacent straight sides of adjacent cover members, a plurality of shaped flexible members, each having opposite straight diverging edges and a connecting edge extending between said straight edges, means connecting a first straight edge of each flexible member to a first straight side of a cover member with the connecting edge of each flexible member being located inwardly of the periphery of the mirror and each of said flexible members being dimensioned so that with the cover members closed the other straight edge of each flexible member overlaps the adjacent cover member and guide means on each cover member and acting on the connecting edge of the flexible member of an adjacent cover member to maintain contact between each said flexible member and the cover member which it overlaps whilst permitting relative movement between the cover members and flexible members to cover said gaps for any open position of said cover members.

2. In a telescope incorporating a mirror, a mirror cover comprising a series of movable cover members pivotably mounted around the periphery of the mirror for pivotal movement toward and away from the axis of the mirror, each cover member having two straight converging sides which, when the cover members lie in closed position in a plane substantially perpendicular to the axis of the mirror, are disposed radially with respect to said axis, a mechanically actuated rod connected to each of said cover members, a series of separate, turnable shafts, universal joints connecting the separate shafts together, and said shafts being connected to said rods, means for imparting turning movement to said shafts so that said rods may be actuated to cause the cover members to pivot in unison about the periphery of the mirror from said closed position where they fit together to cover at least an annular portion of the mirror to an open position in which the cover members lie in different planes with gaps defined between adjacent straight sides of adjacent cover members, a plurality of shaped flexible members each having opposite straight diverging edges and a connecting edge extending between said straight edges, means connecting a first straight edge of each flexible member to a first straight side of a cover member with the connecting edge of each flexible member being located inwardly of the periphery of the mirror end each of said flexible members being dimensioned so that with the cover members closed the other straight edge of each flexible member overlaps the adjacent cover member and guide means on each cover member and acting on the connecting edge of the flexible member of an adjacent cover member to maintain contact between each said flexible member and the cover member which it overlaps whilst permitting relative movement between the cover members and flexible members to cover said gaps for any open position of said cover members.

References Cited by the Examiner

UNITED STATES PATENTS

| | | | |
|---|---|---|---|
| 1,141,970 | 6/15 | Matsuda | 95—47 |
| 1,202,294 | 10/16 | Lang | 95—47 |
| 2,361,765 | 10/44 | Grimes | 240—46.03 X |
| 2,439,330 | 4/48 | Zander | 88—61 |
| 2,995,997 | 8/61 | Nieuwenhoven. | |

OTHER REFERENCES

The Engineer, volume 166, September 16, 1938, pages 298–301.

DAVID H. RUBIN, *Primary Examiner.*